(12) United States Patent
Jenks

(10) Patent No.: US 11,619,269 B2
(45) Date of Patent: Apr. 4, 2023

(54) ACTUATOR ANTI-ROTATION BRACKET POSITIONING DEVICE

(71) Applicant: Johnson Controls Technology Company, Auburn Hills, MI (US)

(72) Inventor: Russell T. Jenks, Franksville, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 462 days.

(21) Appl. No.: 16/660,596

(22) Filed: Oct. 22, 2019

(65) Prior Publication Data

US 2021/0115977 A1    Apr. 22, 2021

(51) Int. Cl.

| F16F 13/14 | (2006.01) |
|---|---|
| F16D 1/10 | (2006.01) |
| F15B 15/20 | (2006.01) |
| F16D 1/06 | (2006.01) |
| F16H 57/02 | (2012.01) |
| F16H 57/025 | (2012.01) |
| F24F 13/14 | (2006.01) |

(52) U.S. Cl.
CPC ............ *F16D 1/101* (2013.01); *F15B 15/202* (2013.01); *F16D 1/06* (2013.01); *F16D 2001/062* (2013.01); *F16H 57/025* (2013.01); *F16H 2057/02034* (2013.01); *F24F 2013/1433* (2013.01)

(58) Field of Classification Search
CPC ...... F16D 1/06; F16D 1/101; F16D 2001/062; F15B 15/202; F16H 57/025; F16H 2057/02034; F24F 2013/1433
USPC ......................................... 403/116
See application file for complete search history.

(56) References Cited

U.S. PATENT DOCUMENTS 2,239,004 A * 4/1941 Jung .................. A44B 17/0011
                                                                    24/669
5,581,222 A    12/1996 Pinaud
(Continued)

FOREIGN PATENT DOCUMENTS

WO    WO-2013/013334 A2    1/2013

OTHER PUBLICATIONS

Partial European Search Report on EP 20203208.2, dated Jun. 8, 2021, 9 pages.

*Primary Examiner* — William C Joyce
(74) *Attorney, Agent, or Firm* — Foley & Lardner LLP

(57) ABSTRACT

During installation, an engagement structure of an actuator assembly positioning device restricts movement of a securement element of an anti-rotation bracket past a target location (e.g. midpoint) relative to a securement slot of an thereby, thereby guiding a user in positioning the anti-rotation bracket and actuator in a desired mounting arrangement. An optional constricting structure of the positioning device provides tactile feedback that the desired arrangement of the anti-rotation bracket and actuator has been reached. Upon being subject to a force in excess of a threshold force (e.g., as a result of eccentric loading on the actuator arising from an off-centered mounting of the actuator relative to a rotatable shaft), the engagement structure transitions to a second configuration in which the securement element is allowed to move past the target location, thereby accommodating eccentric movement of the actuator during operation.

11 Claims, 11 Drawing Sheets

(56) References Cited

U.S. PATENT DOCUMENTS

| | | | |
|---|---|---|---|
| 6,152,642 A * | 11/2000 | Berthold | B60T 11/16 |
| | | | 24/669 |
| 6,505,991 B2 | 1/2003 | Roman | |
| 7,025,328 B2 | 4/2006 | Ulicny et al. | |
| 9,016,662 B2 * | 4/2015 | Staffiere | F16K 31/055 |
| | | | 251/129.11 |
| 10,054,166 B2 | 8/2018 | Bakken et al. | |
| 2017/0241560 A1 | 8/2017 | Bakken et al. | |

\* cited by examiner

ACTUATOR ANTI-ROTATION BRACKET POSITIONING DEVICE

BACKGROUND

The present disclosure relates to actuators. More particularly, the present disclosure relates to anti-rotation brackets.

Anti-rotation brackets are used with actuators to prevent rotation of an actuator during its operation. During installation of an actuator, a securement element of an anti-rotation bracket is positioned within a securement slot of the actuator. The anti-rotation bracket is secured to a. mounting surface.

During operation of the actuator, the arrangement of the engagement element within the engagement slot restricts the ability of the actuator to pivot relative to the shaft, thereby allowing torque to be transferred from the actuator to the shaft of an actuatable device to effectuate a rotation of the shaft. In some embodiments, the engagement element is arranged in a target location relative to a length of the securement slot (e.g., a center of the securement slot) to accommodate eccentric loading on the actuator during operation of the actuator.

SUMMARY

In one implementation of the present disclosure, an actuator assembly includes a housing, a drive member, a shaft adapter, a wall defining a slot, and a positioning device. The drive member is operably connected to a drive mechanism supported by the housing. The shaft adapter includes a shaft engaging component configured to be rotationally secured relative to a shaft of an actuatable control device, and a drive member engaging component operably coupling the shaft engaging component to the drive member. The slot extends between an open-end formed along an edge of the wall and a second end. A width of the slot as defined by the wall is substantially uniform between the open-end and the second end. The positioning device includes a pair of moveable legs that define an upper section and a lower section. A first leg of the pair of legs is separated from a second leg of the pair of legs by a first distance in the upper section, and is separated from the second leg by a second distance in the lower section. The second distance is greater than the first distance. The positioning device is supported along a surface of the wall such that the positioning device extends along a length of the slot.

In some embodiments, the lower section of the positioning device includes a constricted portion located between a first end and a second end of the lower section. A width of the lower section is defined by a third distance that is greater than the first distance and less than the second distance.

In some embodiments, the actuator assembly further includes an anti-rotation bracket including a securement element. The securement element is configured to be received within the slot. A width of the securement element is greater than each of the first distance and the third distance, and substantially the same as the second distance. In some embodiments, the constricted portion of the lower section is defined by a portion of each of the first leg and the second leg.

In some embodiments, the positioning device is spring clip. The spring clip is optionally secured between an exterior surface of the housing and a cover plate attached to and extending along the exterior surface of the housing. In some embodiments, the spring clip is received within a groove formed in one of the cover plate and the exterior surface of the housing. In some embodiments, the wall is defined by the cover plate.

In one implementation of the present description, an actuator includes a housing, a drive member, a shaft adapter, a wall defining a slot, and a positioning device. The drive member is supported within the housing. The drive member is configured to operably engage and rotate an elongated member. The shaft adapter is supported relative to the drive member adjacent a first end of the housing. The shaft adapter includes a drive member engaging portion and an elongated member engaging portion configured to secure and rotationally fix the shaft adapter relative to an elongated member. The slot is configured to receive a securement element of an anti-rotation bracket. The positioning device is supported relative to the wall and includes an engagement structure configured to engage a securement element of an anti-rotation bracket that has been inserted into the slot. The engagement structure defines a first travel path along the slot having a first length during installation of the actuator, and defines a second travel path along the securement slot having a second length during operation of the actuator. The second length is greater than the first length.

In some embodiments, the first travel path is defined between an open end of the slot and a first position along the length of the slot. The second travel path is defined between the open end of the slot and a second position along the length of the slot that is located between the first position and a closed end of the slot.

In some embodiments the engagement structure includes a passageway that defines each of the first travel path and the second travel path. The securement element is positioned within the passageway of the positioning device during installation of the actuator. In some embodiments, the engagement structure includes a pair of legs. The passageway is defined between a first leg and a second leg of the pair of legs. In some embodiments, a portion of the passageway extending along the slot between the second position and the closed end of the slot is defined by a first width during installation of the actuator, and by a second width during operation of the actuator. The second width is greater than the first width. In some embodiments, the positioning device is defined by a spring clip.

In some embodiments, the positioning device further includes a constricted portion that is located at a third position along the length of the slot located between the first position and the open end of the slot. A width of the travel path at the constricted portion is less than a width of the securement element.

In some embodiments, the engagement structure extends across a width of the slot at a location along the length of the slot corresponding to the first position during installation of the actuator, and extends across a width of the slot at a location along the length of the slot corresponding to the second position during operation of the actuator.

According to one implementation of the present disclosure, a method includes securing an actuator to a rotatable shaft of an aduatable device. The actuator includes a drive member operably connected to a drive mechanism, a shaft adapter that secures the actuator to the shaft, a wall defining a slot, and a positioning device including an engagement structure that extends across a width of the slot at a first location along a length of the slot when in a first configuration. A securement element of an anti-rotation bracket is positioned within the slot during installation of the actuator assembly and while the positioning device is in the first configuration. The securement element is moved relative to the slot in a first direction until the securement element engages the engagement structure. The engagement between the securement element and engagement structure restricts movement of the securement element in the first direction past a portion of the slot defining the first position. The anti-rotation bracket is mounted to a mounting structure while the securement element is located within the slot at the first location.

In some embodiments, the positioning device transitions from the first configuration to a second configuration during operation of the actuator to rotate the shaft and in response to the engagement structure being subject to a force greater than a predetermined force. The securement element is moveable in the first direction, from the first position to a position located at a length along the slot that is between the first position and a closed end of the slot, in response to the force.

In some embodiments, the positioning device further includes a constricting structure. The constricting structure extends across the width of the slot at a second position along the length of the slot located between an open, first-end of the slot and the first position while the positioning device is in the first configuration. A width of a travel path defined by the slot is wider at the first position than a width of the travel path at the second position. An engagement of the securement structure and the constricting structure occurs as the securement element is moved relative to the slot in the first direction during installation of the actuator assembly and causes the constricting structure to be deflected outwards.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

DETAILED DESCRIPTION

The flow of fluids (liquids and/or gases) through a system is often regulated using one or more actuatable flow control devices (e.g. dampers, valves, ventilation flaps, louvers, and/or other devices). For example, the flow of air through heating, ventilation and/or air conditioning ("HVAC") ducts in buildings is typically controlled by the selective opening and closing of one or more damper vanes positioned within the HVAC ducts.

The selective actuation of a flow control device between different flow configurations is often effectuated using a rotatable shaft (e.g. elongated member, valve stem, elongated member, axle, etc.) operably connected to the control device. Rotation of the shaft about its longitudinal axis allows the control device to be transitioned between various flow configurations to attain a desired flow through the system. Such rotation is commonly accomplished using torque that has been transmitted to the shaft from a drive unit of an actuator mounted relative to the shaft.

Figure 1:
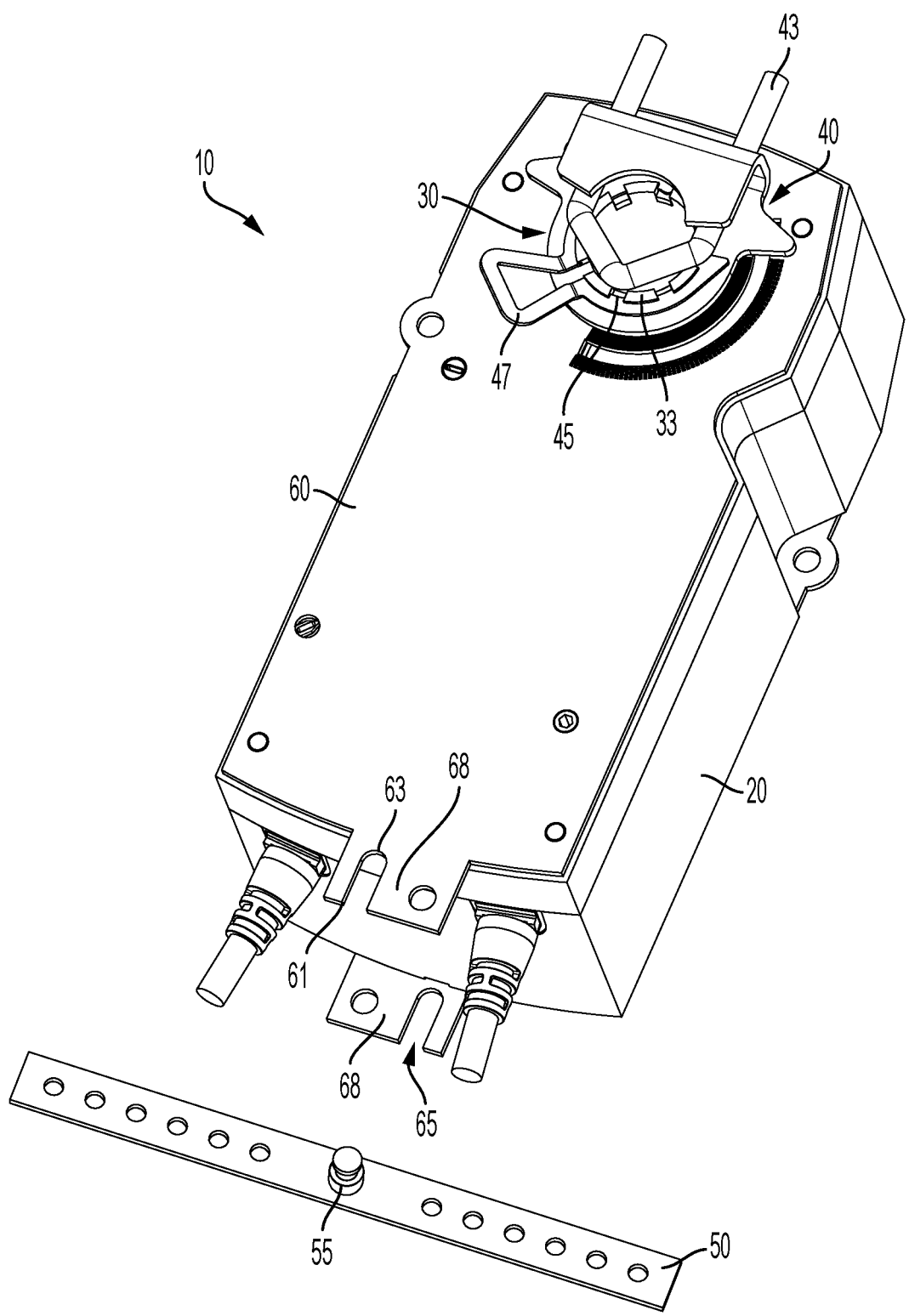
FIG. 1 is a perspective view of an actuator, according to one embodiment.

Representatively illustrated in FIG. 1 is an example of an actuator assembly comprising an anti-rotation bracket and an actuator 10 that may be used to selectively drive the shaft of an actuatable control device, according to one embodiment. As shown in FIG. 1, the actuator 10 includes a housing 20, within which the drive unit (e.g. a motor) is stored. Energy from the drive unit is used to drive (e.g. rotate) a drive mechanism 30 of the actuator 10.

A shaft adapter 40 of the actuator 10 transfers rotational energy from the drive mechanism 30 to the shaft of the actuatable control device. The shaft adapter 40 is located adjacent a first end of the housing 20, and includes a shaft engaging portion and a drive mechanism engaging portion. The shaft engaging portion includes one or more securement elements, such as, e.g., a bolt 43, to secure and rotationally fix the shaft adapter 40 relative to a shaft. The shaft engaging portion optionally defines an adjustable sized opening within which the shaft is located, such that shafts of varying dimensions may be accommodated by the actuator 10. The drive mechanism engaging portion includes one or more engagement elements, such as, e.g., grooves 45 and a retaining ring 47, that engage a corresponding engagement element, e.g., protrusions 33 on the drive mechanism 30 to operably connect the shaft adapter 40 to the drive mechanism 30.

To allow torque to be transferred to the shaft, the actuator 10 is secured against rotation relative to the shaft using an anti-rotation bracket 50. During installation of the actuator 10, a securement element 55, such as, e.g., a screw, rivet, bolt, pin, etc., of the anti-rotation bracket 50 is positioned within an opening defined by the actuator 10. The arrangement of the securement element 55 within the opening restricts the housing 20 from pivoting about the shaft during operation of the actuator 10.

During operation of the actuator 10, an off-center arrangement of the shaft relative to the shaft adapter 40 may result in eccentric loading on the actuator 10, and an uneven distribution of torque to the shaft—leading to possible damage to the actuator 10 and a reduced output of torque to the shaft. To offset the effects of an off-centered mounting of the actuator 10, the opening within which the securement element 55 of the anti-rotation bracket 50 is positioned is advantageously defined by an securement slot 65, such as shown in FIG. 1. As illustrated by the actuator 10 embodiment of FIG. 1, the securement slot 65 may he defined at a lower portion of a cover plate 60 that is attached to and extends along a surface of the housing 20. According to other embodiments, the securement slot 65 may he defined by other components (e.g. housing 20) of the actuator 10.

The elongated length of the securement slot 65 provides the actuator 10 with a limited degree of freedom to move relative to the securement element 55 of the anti-rotation bracket 50 during the operation of the actuator 10. By providing the actuator 10 with the ability to move responsive to an eccentric loading of the actuator 10, the securement slot 65 allows the actuator 10 to mitigate the effects of an off-centered mounting of the actuator 10.

Figure 2:
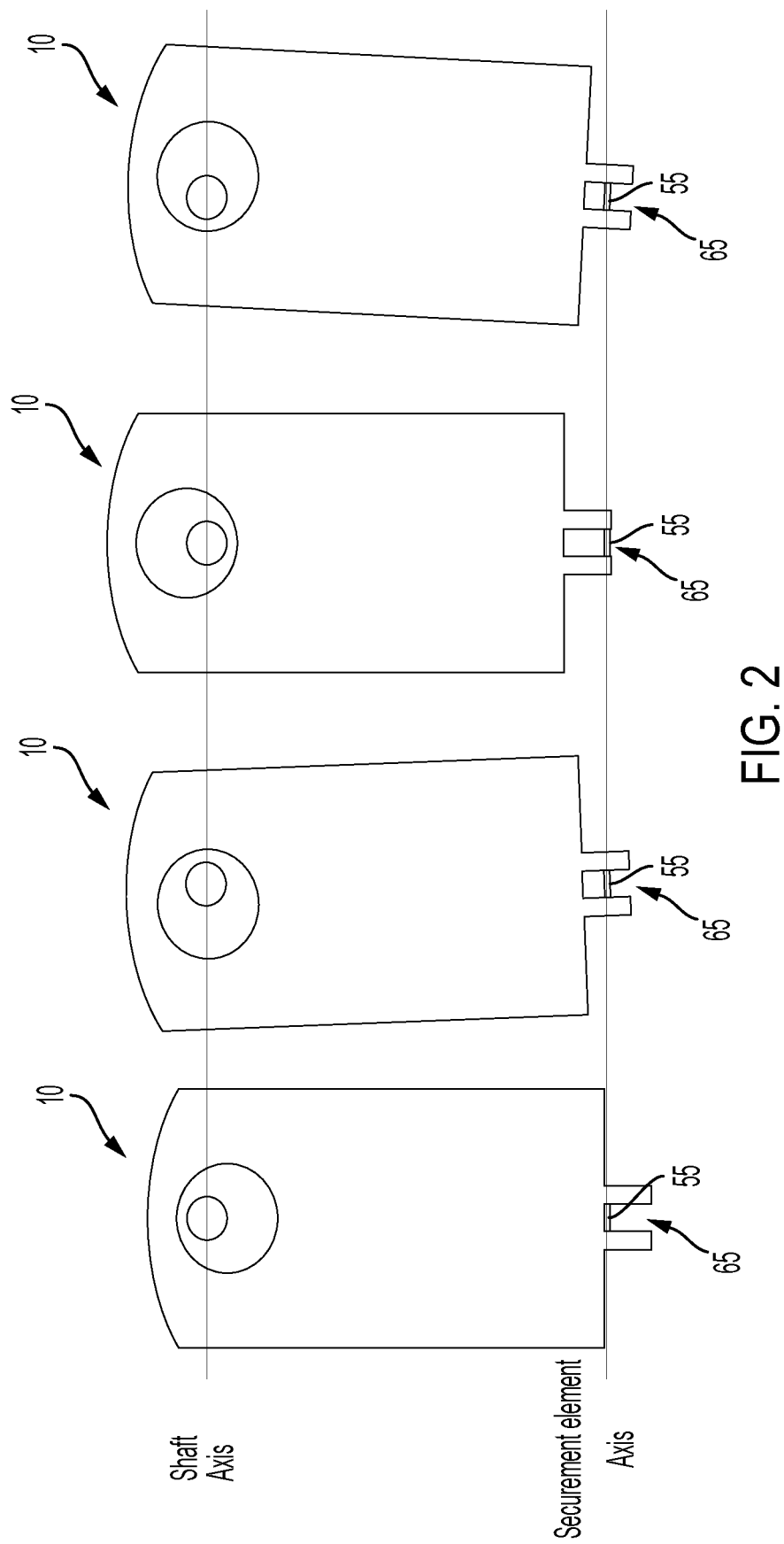
FIG. 2 is a schematic representative of eccentric motion of an actuator, according to one embodiment.

The eccentric motion of an off-centered actuator 10 during operation is illustrated by the representative travel progression of an actuator 10 at various stages of rotation shown in FIG. 2. As shown in FIG. 2, the rotation of an off-centered actuator 10 may result in an upwards and downwards movement of the securement slot 65 (and attached actuator 10) relative to the securement element 55 during operation of an actuator 10. In addition to varying based on the degree of rotation, the direction (i.e. upwards or downward) and distance by which the securement slot 65 travels relative to the securement element 55 during operation of the actuator 10 varies based on the degree to which the actuator 10 is located off-center relative to the shaft.

Figure 3C:
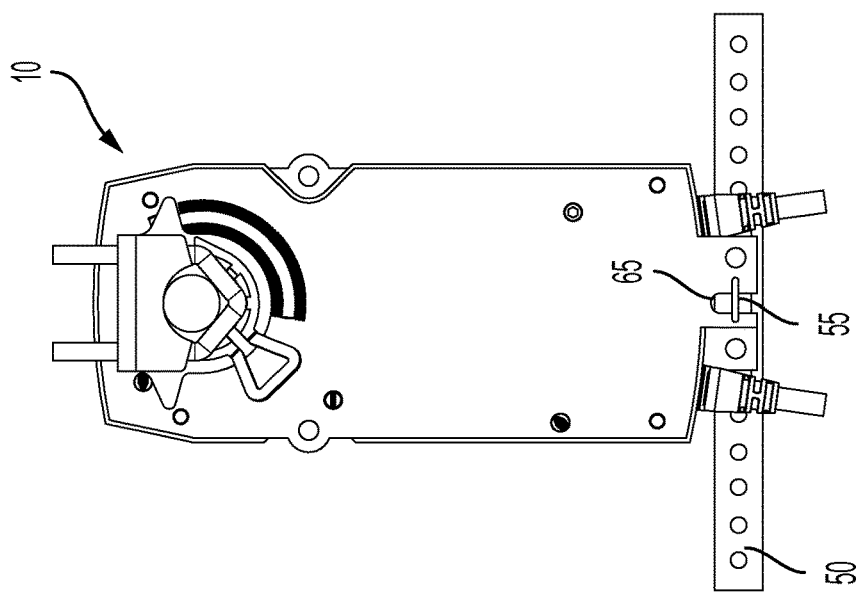
FIG. 3C illustrates a centered mounting configuration of an actuator relative to an anti-rotation bracket, according to one embodiment.

During the installation of an actuator 10, the mounting of an anti-rotation bracket 50 in a configuration in which the securement element 55 is located below a mid-point along the length of the securement slot 65, such as representatively shown in FIG. 3A, may result in the securement slot 65 travelling upwards past the securement element 55 during eccentric travel of the actuator 10, causing the actuator 10 and anti-rotation bracket 50 to become disengaged during operation.

Figure 3B:
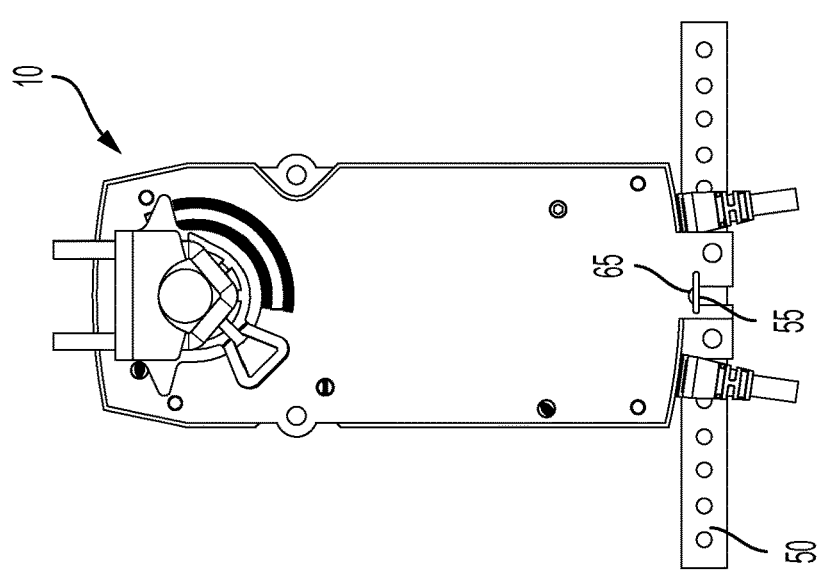
FIG. 3B illustrates an off-centered mounting configuration of an actuator relative to an anti-rotation bracket, according to one embodiment.
Figure 3A:
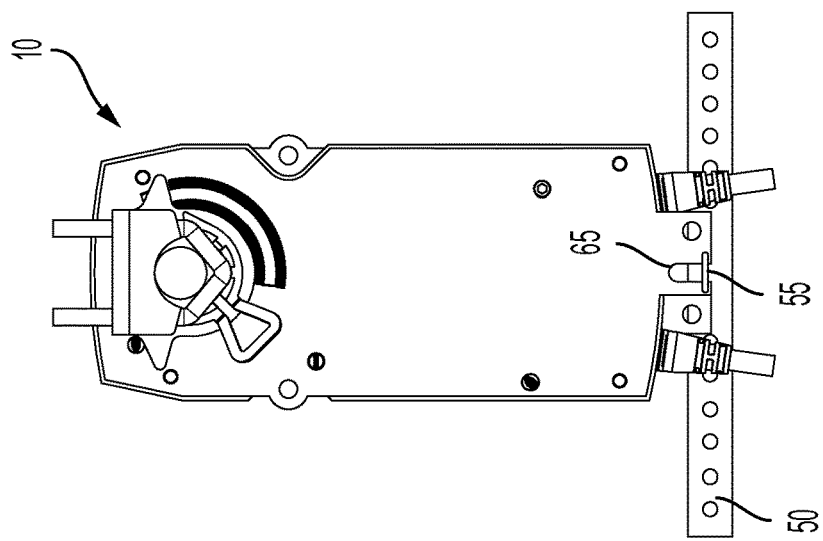
FIG. 3A illustrates an off-centered mounting configuration of an actuator relative to an anti-rotation bracket, according to one embodiment.

Mounting an anti-rotation bracket 50 in a configuration in which the securement element 55 is located above a midpoint along the length of the securement slot 65, such as representatively shown in FIG. 3B, is also undesirable. Namely, such an initial arrangement of the securement element 55 within the securement slot 65 may limit the maximum distance by which the actuator 10 is able to travel relative to the securement element 55. This inability of the actuator 10 to accommodate a fill range of motion of the securement slot 65 relative to the securement element 55 may result in binding of the actuator components.

In some embodiments, to accommodate a maximum (e.g., the entire) range of eccentric motion of an actuator 10, the securement element 55 of the anti-rotation bracket 50 is positioned at a mid-point along a length of the securement slot 65, such as representatively shown in FIG. 3C, prior to attaching the anti-rotation bracket 50 to a mounting surface. Such a centered arrangement allows the actuator 10 to accommodate both upwards and downwards eccentric motion of the actuator 10, and thus avoids the undesirable situations which may be encountered as a result of an off-centered arrangement of the actuator 10 and anti-rotation bracket 50.

Despite the desirability of a centered arrangement of the securernent element 55 within the securement slot 65 during the installation, anti-rotation brackets are commonly mounted in an off-centered configuration relative to a securement slot of an actuator. Such incorrect mounting is often the result of the environment in which the actuator is being mounted (e.g., constrained physical space at a mounting site, limited user visibility of a mounting surface, etc.) and/or as a result of a user not being aware of the consequences of an off-centered mounting of the anti-rotation bracket 50 relative to the actuator 10.

Referring generally to FIGS. 4-11B, a positioning device 100 for an actuator 10 is shown according to various embodiments. The positioning device 100 provides an intuitive, tool-free, and simple solution that self-centers (or directs to any other desired arrangement of) an anti-rotation bracket 50 relative to an actuator 10 during installation. The positioning device 100 is able to guide a user in bringing the anti-rotation bracket 50 and actuator 10 into a target configuration during installation without sacrificing the ability of the securement slot 65 to accommodate eccentric motion of the actuator 10 during subsequent operation of the actuator 10. Accordingly, the positioning device 100 may be used to minimize (e.g., prevent) undesirable consequences such as binding of the actuator components, and even disengagement of the actuator from the anti-rotation bracket, during operation of an actuator 10.

An actuator 10 including a positioning device 100 according to one example embodiment is shown in FIGS. 4-6B.

Figure 4:
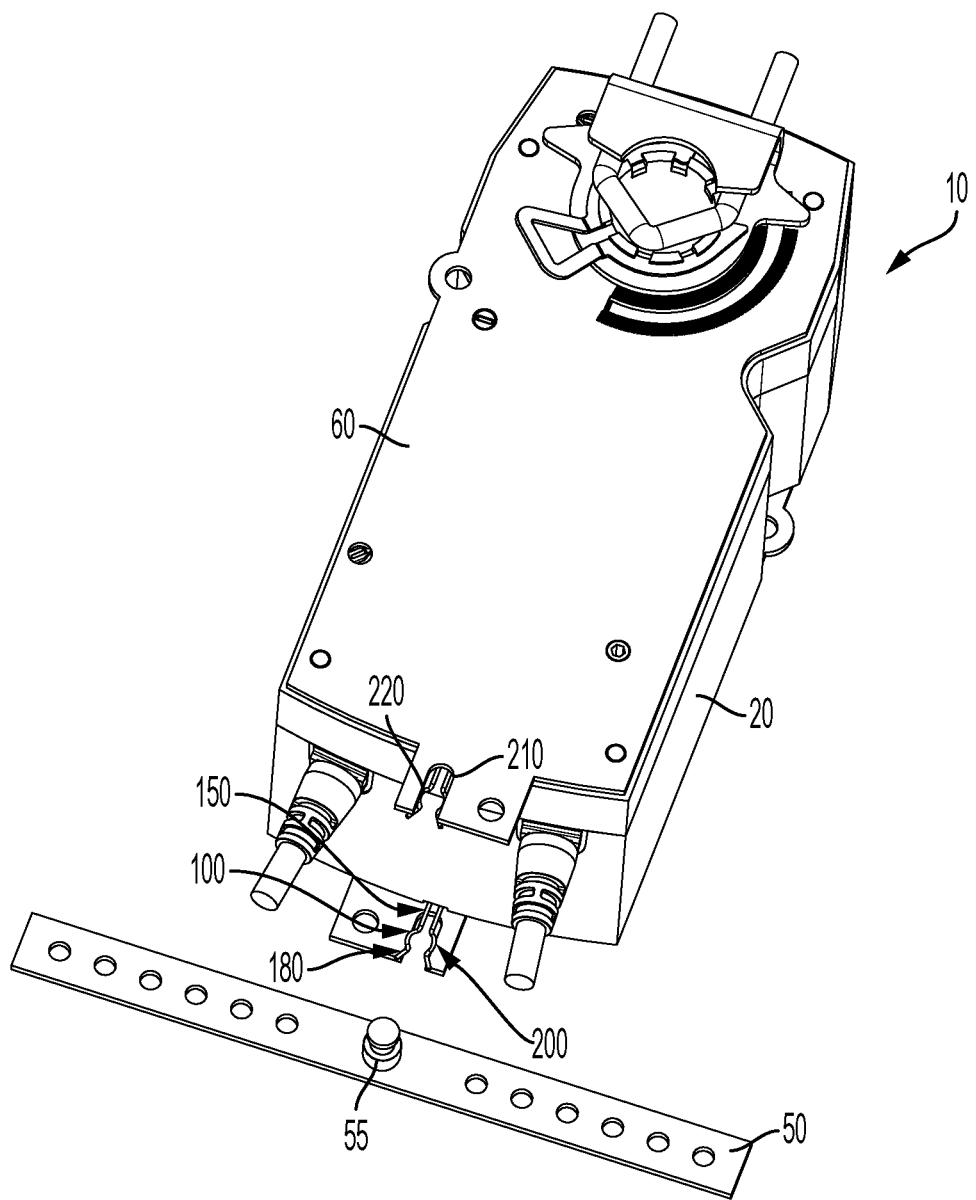
FIG. 4 is a perspective vie of an actuator including a positioning device, according to one embodiment.
Figure 5:
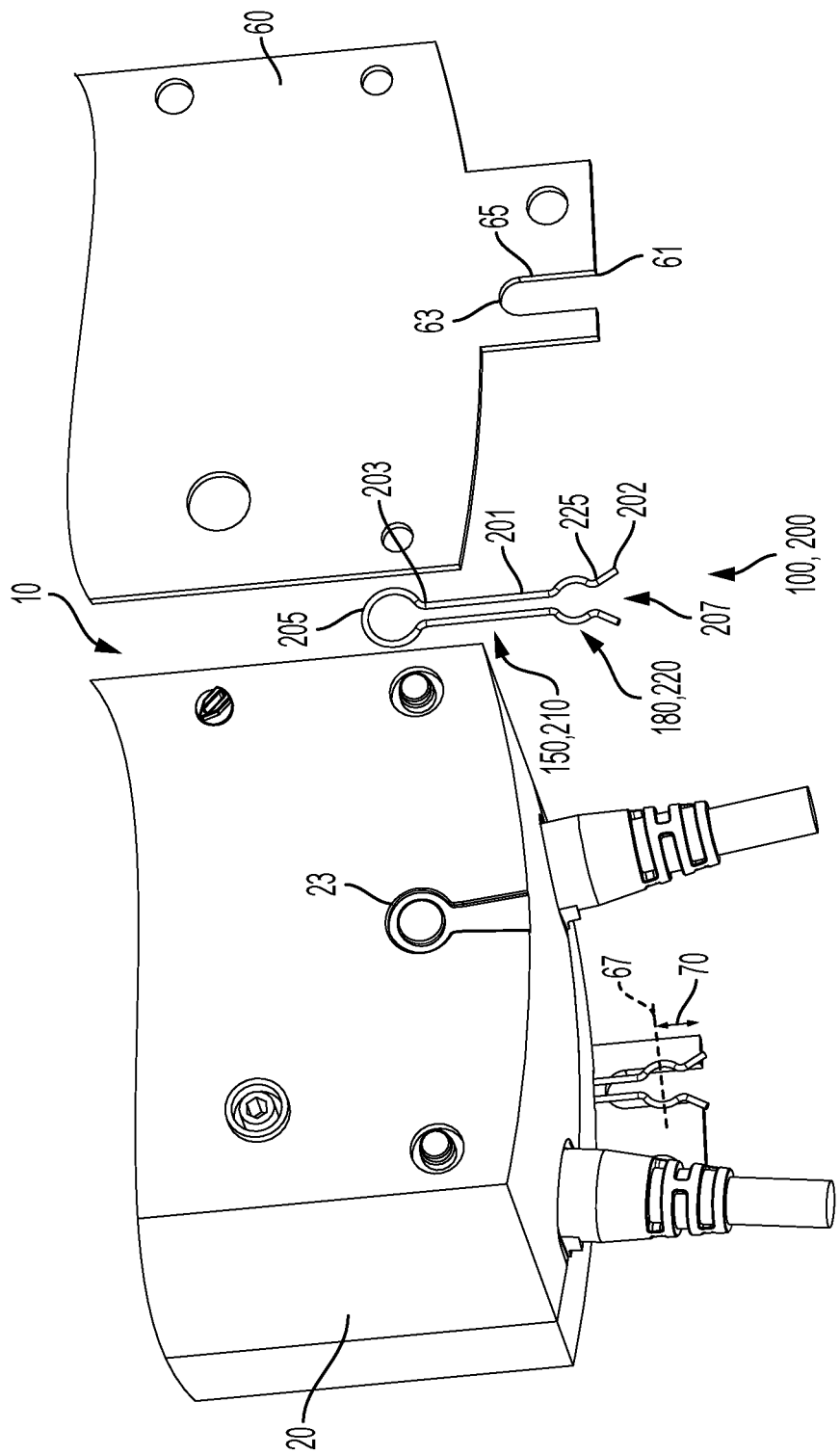
FIG. 5 is a detailed, exploded view of the actuator and positioning device of FIG. 4, according to one embodiment.

The positioning device 100 embodiment illustrated in FIGS. 4-6B comprises a spring clip 200. As shown in FIG. 5, the spring clip 200 includes a pair of resilient, tensioned legs 201. Each leg 201 includes a lower end 202 and an upper end 203. The free, lower ends 202 of the legs 201 define an opening 207 into a passageway that extends between the pair of legs 201. The upper ends 203 of the legs 201 are fixedly secured relative to one another and the actuator 10. The upper ends 203 of the resilient legs 201 are optionally secured relative to one another via a connector portion 205.

The spring clip 200 includes an upper section 210 and a lower section 220. The upper section 210 extends between the lower section 220 and the upper ends 203 of the pair of legs 201 (e.g., between the upper section 210 and the connector portion 205). The upper section 210 defines an engagement structure 150 (described in more detail below) of the positioning device 100 defined by the spring clip 200.

Figure 6A:
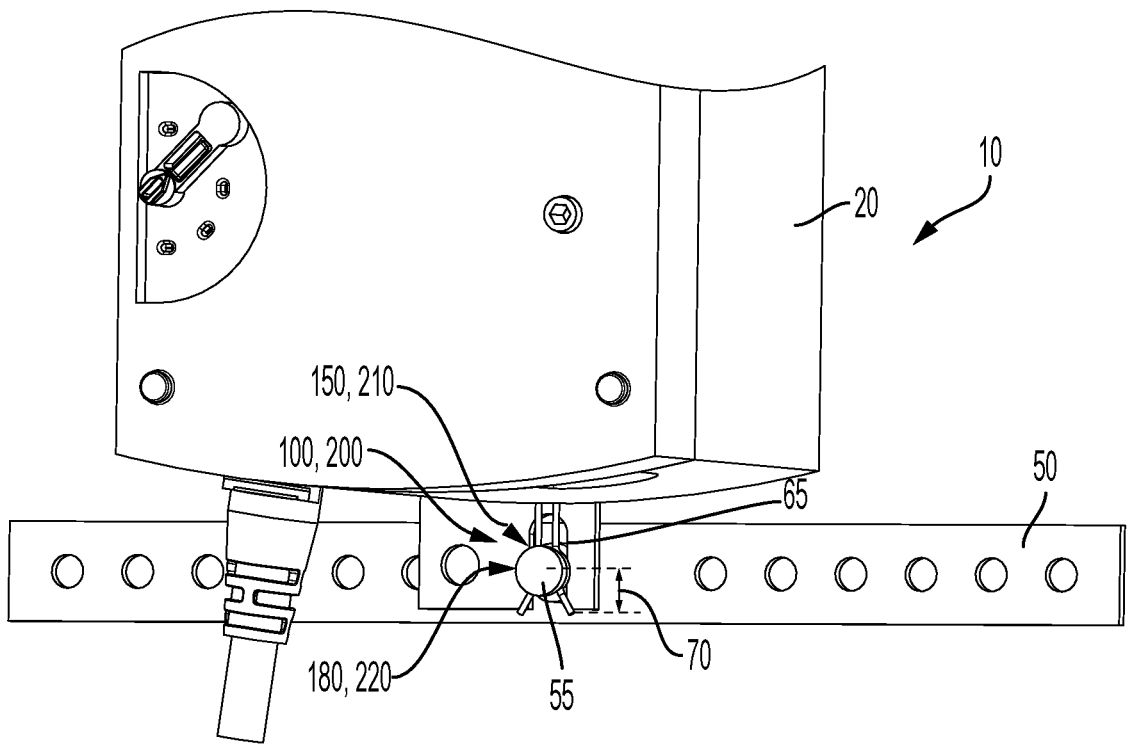
FIG. 6A is a detailed perspective view of the actuator and positioning device of FIG. 4 mounted to an anti-rotation bracket, in which the positioning device is in a first configuration, according to one embodiment.

As shown in FIG. 6A, in a first configuration of the spring clip 200, the tension of the resilient legs 201 in the upper section 210 restricts movement of a securement element 55 inserted into the securement slot 65 past a target position 67 along the length of the securement slot 65. As described in more detail below, such an initial, first configuration of the spring clip 200 facilitates the centering of an anti-rotation bracket 50 and actuator 10 during installation.

Figure 6B:
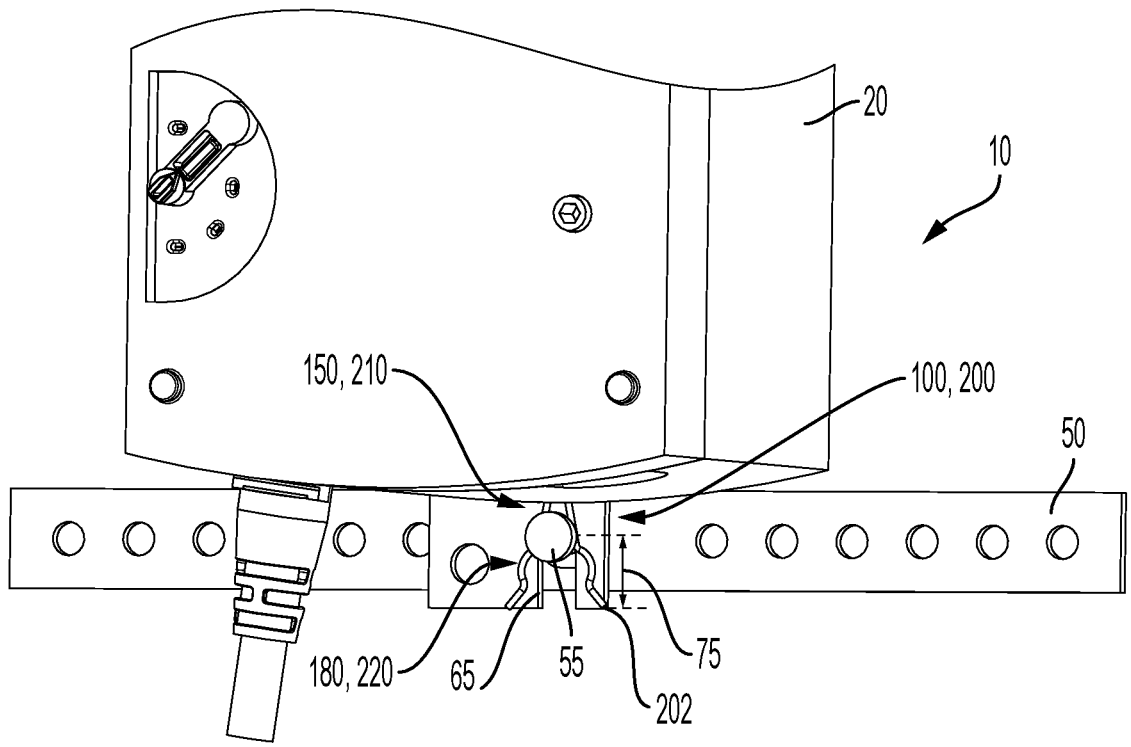
FIG. 6B is a detailed perspective view of the actuator and positioning device of FIG. 4 mounted to an anti-rotation bracket, in which the positioning device is in a second configuration, according to one embodiment.

As shown in FIG. 6B, upon being exposed to a force sufficient to overcome the tensioned bias of the legs 201, the upper section 210 of the spring clip 200 is flexed outwards, allowing the securement element 55 to move past the target position 67 and towards the closed-end 63 of the securement slot 65. As described in more detail below, such a second configuration of the spring clip 200 allows eccentric motion of the actuator 10 to be accommodated during operation of the actuator 10.

The lower section 220 of the spring clip 200 extends between the opening 207 and the upper section 210, and defines a constricting structure 180. As described in more detail below, the bent portions 225 of the lower section 220 define inwardly extending projections that provide tactile feedback to a user during the installation of the anti-rotation bracket 50 and actuator 10, and thus provide additional assistance to a user during the mounting of the securement element 55 relative to the securement slot 65.

As described in more detail below, the positioning device 100 may he defined by a variety of structures in addition to the spring clip 200 embodiment of FIGS. 4-6B. In general, a positioning device 100 according to any of the embodiments described herein is securable to an actuator 10, and includes an engagement structure 150 (e.g., upper section 210 of spring clip 200). The engagement structure 150 of the positioning device 100 is configured deform, move, or otherwise transition between a first configuration (see, e.g. FIGS. 6A, 7A, 8A, 9A, 10A and 11A) and a second configuration (see, e.g. FIGS. 6B, 7B, 8B, 9B, 10B, and 11B).

In a first configuration of a positioning device 100 (e.g., spring clip 200) the engagement structure 150 extends across at least a portion of a width of a securement slot 65 of the actuator 10. This arrangement of the engagement structure 150 relative to the securement slot 65 defines a first travel path 70 along a length of the securement slot 65. The first travel path 70 is defined by a portion of the securement slot 65 that extends between an open-end 61 of the securement slot 65 and a target position 67 located along the length of the securement slot 65.

The target position 67 corresponds to a location along the length of the securement slot 65 at which it is desired that the securement element 55 be positioned upon installation of the actuator 10. For example, as illustrated in FIG. 6A, the target position 67 corresponds to a mid-point along the length of the securement slot 65, such that the securement slot 65 is guided to a centered position relative to the securement element 55 during installation.

While the positioning device 100 (e.g. spring clip 200) is in the first configuration, the engagement structure 150 (e.g. upper section 210 of spring clip 200) restricts movement of the securement element 55 relative to the securement slot 65 to a portion of the securement slot 65 defining the first travel path 70. As the securement element 55 moves relative to the securement slot 65 during installation, tactile and/or visual feedback occurring upon the engagement of the securement element 55 and the engagement structure 150 indicates to a user that a desired arrangement of the anti-rotation bracket 50 and actuator 10 has been reached.

As discussed above with regards to the representative positioning device 100 embodiment of FIG. 4, the positioning device 100 (e.g. spring clip 200) optionally includes a constricting structure 180 (e.g,. lower portion 220 of spring clip 200) to provide a user with additional tactile feedback indicative of the actuator 10 and anti-rotation bracket 50 being brought into a desired mounting arrangement. The constricting structure 180 includes one or more inwardly extending projections (e.g. bent portions 225 of spring clip 200) located at a position along the first travel path 70 that is spaced from the target position 67 by a distance generally corresponding to a length of the securement element 55.

Although in the embodiment of FIG. 4 the constricting structure 180 and engagement structure 150 of the positioning device 100 define a single, one-piece component, in other embodiments, the constricting structure 180 may be secured relative to the actuator 10 as a discrete component from the engagement structure 150.

Upon being subject to a predetermined displacement force, the inwardly extending projection(s) of the constricting structure 180 are displaced (e.g., are compressed, flexed, pushed, biased, or otherwise moved) in an outward direction (i.e., in a direction transverse to and away from an axis along which the securement slot 65 extends). The positioning device 100 is optionally constructed such that the displacement force required to displace the inwardly extending projection (e.g. bent portions 225 of spring clip 200) of the constricting structure 180 (e.g. lower portion 220 of spring clip 200) is less than the threshold force required to transition a positioning device 100 between the first configuration (see, e.g., FIG. 6A) and the second configuration (see, e.g., FIG. 6B).

Prior to the insertion of a securement element 55 into the securement slot 65, a width of the first travel path 70 at the inwardly extending projection (e.g. bent portions 225 of spring clip 200) is narrower than a width of the securement slot 65 at other positions along the first travel path 70. Prior to the insertion of the securement element 55 into the securement slot 65, a width of the first travel path 70 at the inwardly extending projection is also narrower than a width of the securement element 55. A width of the first travel path 70 at locations other than at the inwardly extending projection is generally equal to, or greater than, the width of the securement element 55.

During installation of the actuator 10, the movement of the securement element 55 along the portion of the securement slot 65 defining the first travel path 70 towards the target position 67 causes an outward displacement of the inwardly extending projections (e.g., bent portions 225 of spring clip 200). The resistance encountered by the securement element 55 as it moves past the inwardly extending projection(s) provides tactile feedback that provides additional indication to a user that a desired arrangement of the actuator 10 and anti-rotation bracket 50 has been achieved.

In the second configuration of a positioning device 100 (see, e.g., FIG. 6B), the positioning device 100 defines a second travel path 75 along the length of the securement slot 65. The second travel path 75 is defined by a portion of the securement slot 65 that extends between the open-end 61 of the securement slot 65 and a position along the length of the securement slot 65 located between the target position 67 and an upper end (e.g. closed-end 63) of the securement slot 65. Accordingly, a length of the second travel path 75 is greater than a length of the first travel path 70.

As representatively illustrated by FIG. 6B, the increased length of the second travel path 75 provides the actuator 10 with an increased freedom to move relative to the securement element 55, and thereby allows eccentric motion of the actuator 10 to be accommodated during operation. As described above, by accommodating eccentric motion of the actuator 10, torque is more efficiently transferred to the shaft, and binding of the actuator components is minimized. (e.g., prevented).

The transition of the positioning device 100 (e.g., spring clip 200) between the first configuration (see, e.g., FIG. 6A) and the second configuration (see, e.g., FIG. 6B) occurs in response to the engagement structure 150 (e.g. upper section 210 of spring clip 200) of the positioning device 100 (e.g. spring clip 200) being subject to a predetermined threshold force.

To prevent the positioning device 100 (e.g., spring clip 200) from transitioning to the second configuration during installation of the actuator 10, the engagement structure 150 (e.g. upper portion 210 of the spring clip 200) is advantageously constructed with sufficient strength and/or resilience such that the predetermined threshold force at which the positioning device 100 transitions is greater than a maximum force to which the engagement structure 150 would typically be subject during installation of the actuator 10. However, to allow the positioning device 100 to accommodate eccentric motion of the actuator 10, the engagement structure 150 is also constructed such that the predetermined threshold force at which the positioning device 100 transitions is less than a maximum force to which the engagement structure 150 would typically be subject during operation of the actuator 10 (e.g., during eccentric loading). According to various embodiments, the predetermined threshold force optionally corresponds to a force ranging from approximately 2 times and approximately 7 times the weight of the anti-rotation bracket 50.

As noted above and illustrated by FIGS. 7A-11B, the positioning device 100 may be defined by a variety of structures in addition to the spring clip 200 embodiment illustrated in FIGS. 4-6B. According to some embodiments, the positioning device 100 comprises a resilient engagement structure 150 that is deflected, compressed, biased or otherwise stressed in response to the transition of the positioning device 100 to the second configuration. Once the force on the resilient structure is decreased below the threshold force (e.g. removed), the engagement structure 150 returns to its unstressed, first configuration. Examples of resilient engagement structures 150 that may define the positioning device 100 include, e.g.: a leaf spring; a sheet-metal spring (see, e.g. FIGS. 7A and 7B), a coil spring, a wire-form spring (e.g., spring clip 200); a compression spring; a torsion spring (see, e.g., FIGS. 8A and 8B); a compressible spacer element (e.g. a rubber plug); etc.

In other embodiments, the positioning device 100 comprises a deformable engagement structure 150 that is deflected, compressed, or otherwise deformed upon being subject to a force in excess of the threshold force. Similar to the resilient engagement structures 150 discussed above, examples of deformable engagement structure 150 include, e.g.: a leaf spring; a torsion spring; a sheet-metal spring; a coil spring; a wire-form spring; a compression spring; a compressible spacer element (e.g. a rubber plug); etc. However, in contrast to resilient engagement structures 150, deformable engagement structures 150 do not revert their initial, first configurations following the transition of the positioning device 100 to the second configuration. Accordingly, once a positioning device 100 defined by a deformable engagement structure 150 is subject to a force in excess of the threshold force, the positioning device 100 remains in the second configuration.

Figure 9A:
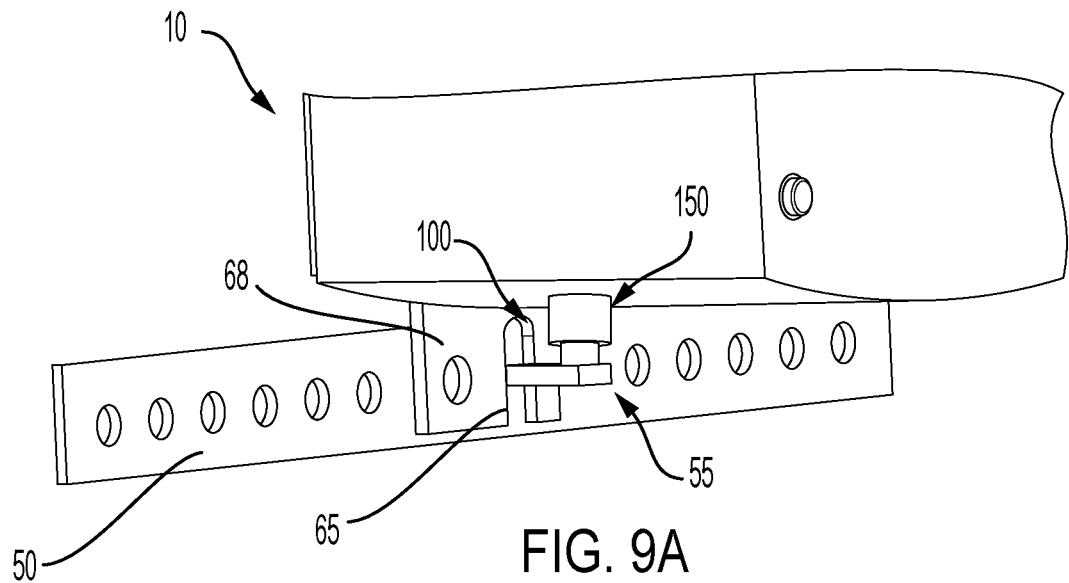
FIG. 9A is a detailed perspective view of a first configuration of an actuator mounted relative to an anti-rotation bracket including a positioning device, according to one embodiment.
Figure 9B:
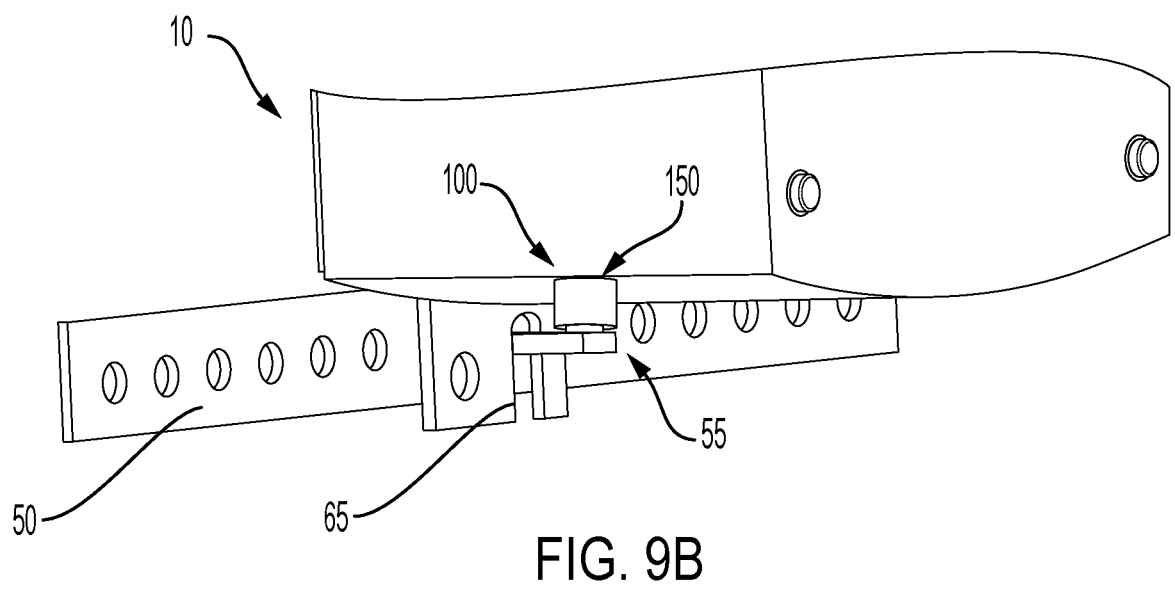
FIG. 9B is a detailed perspective view of a second configuration of the actuator mounted relative to the anti-rotation bracket and positioning device, according to one embodiment.

As representatively illustrated by the positioning device 100 of FIGS. 9A and 9B, according to yet other embodiments, the positioning device 100 comprises an engagement structure 150 defined by a telescoping, articulating, foldable, accordion-like, buckling, collapsible, or other structure that decreases in length upon being subject to a force in excess of the threshold force. The length-changing structure defining the engagement structure 150 in such embodiments may be resilient or deformable, with the engagement structure 150 either extending to its original length or remaining in the collapsed configuration once the force on the engagement structure 150 is decreased (e.g. removed) below the threshold force. Although the positioning device 100 of FIGS. 9A and 9B is shown as being secured relative to the securement element 55 of the anti-rotation bracket 50, according to other embodiments the positioning device 100 of FIGS. 9A and 9B may alternatively be secured relative to the actuator 10 (e.g., from a lower surface of the housing 20).

Figure 10A:
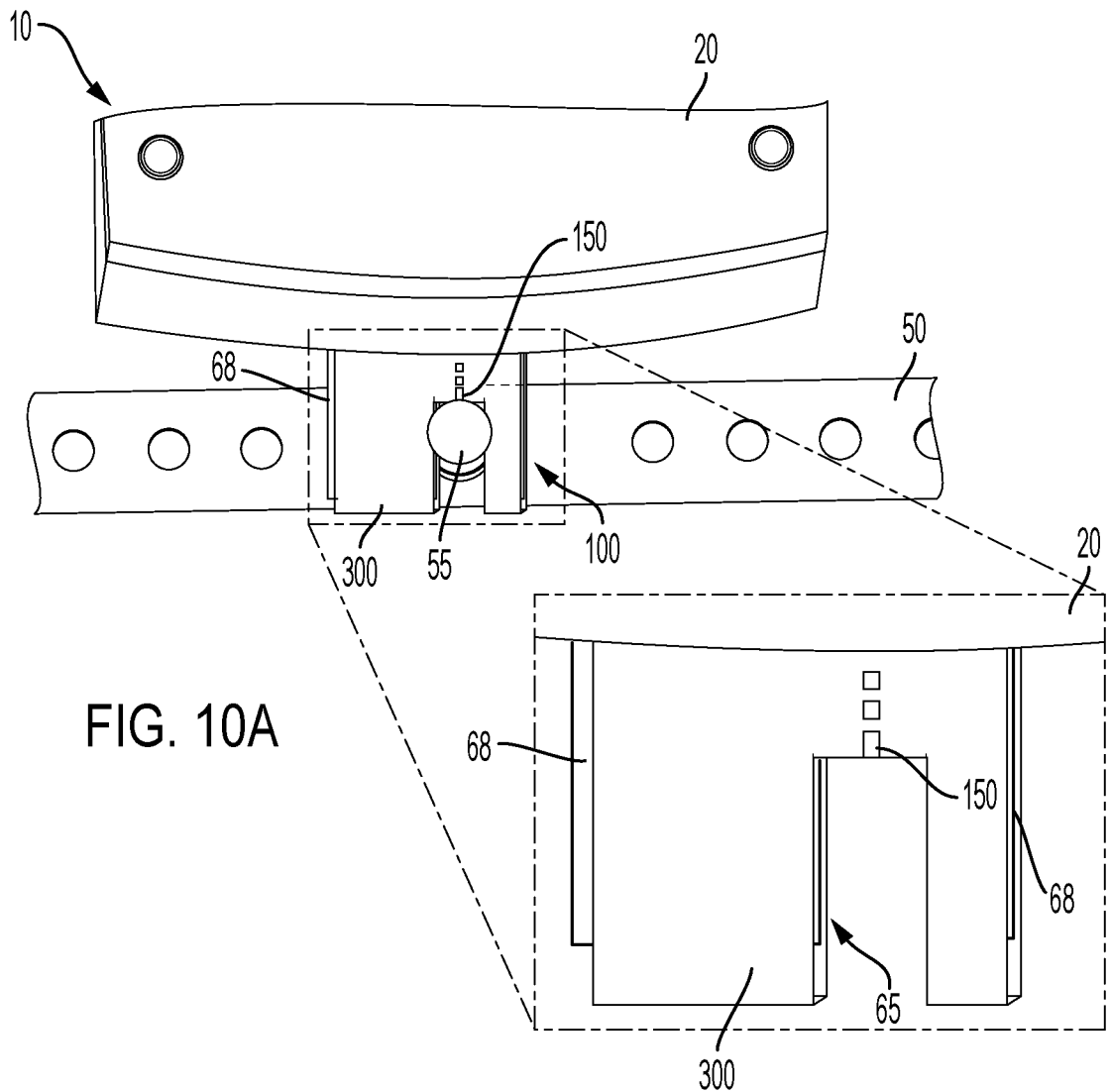
FIG. 10A is a detailed perspective view of a first configuration of an actuator including a positioning device mounted relative to an anti-rotation bracket, with the call-out illustrating the arrangement of the positioning device relative to the securement slot of the actuator prior to the insertion of the anti-rotation bracket securement element into the securement slot, according to one embodiment.
Figure 10B:
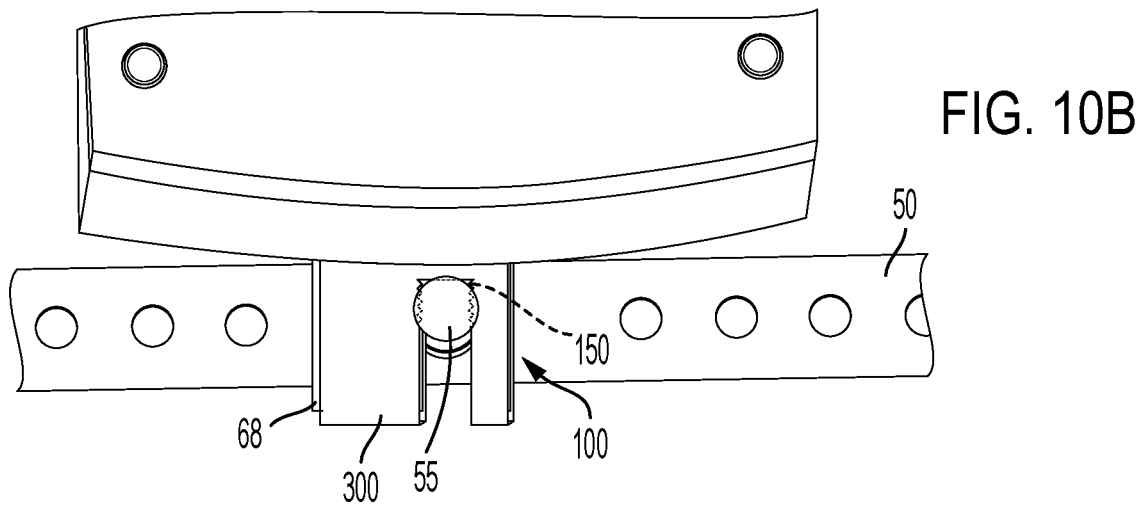
FIG. 10B is a detailed perspective view of a second configuration of the actuator and positioning device mounted relative to the anti-rotation bracket of FIG. 10A, according to one embodiment.

Turning to the FIGS. 10A and 10B, in yet other embodiments the positioning device 100 comprises an engagement structure 150 that is defined by frangible, perforated, or otherwise separable structure in which a first part of the engagement structure 150 is detached from a second part of the engagement structure 150 upon being subject to a force in excess of the threshold force.

In addition to being definable by a variety of different structures and configurations, the positioning device 100 may also be secured to the actuator 10 in a variety of different configurations. For example, as illustrated by the spring clip 200 positioning device 100 embodiment of FIGS. 4-6B, the positioning device 100 may be sandwiched between an exterior surface of the housing 20 and a cover plate 60 defining the securement slot 65. As shown in FIG. 5, the securement of the positioning device 100 (e.g. spring clip 200) to the actuator 10 may be reinforced by optionally positioning the positioning device 100 within a groove 23 defined by the exterior surface of the housing 20 (and/or by an inner surface of the cover plate 60).

Figure 7A:
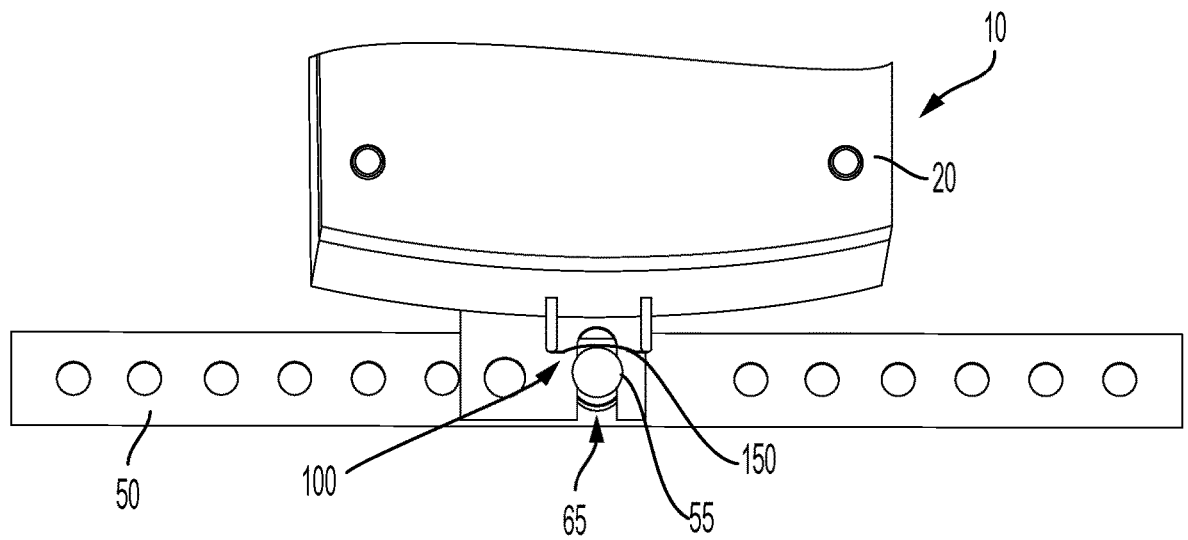
FIG. 7A is a detailed perspective view of a first configuration of an actuator including a positioning device mounted relative to an anti-rotation bracket; according to one embodiment.
Figure 7B:
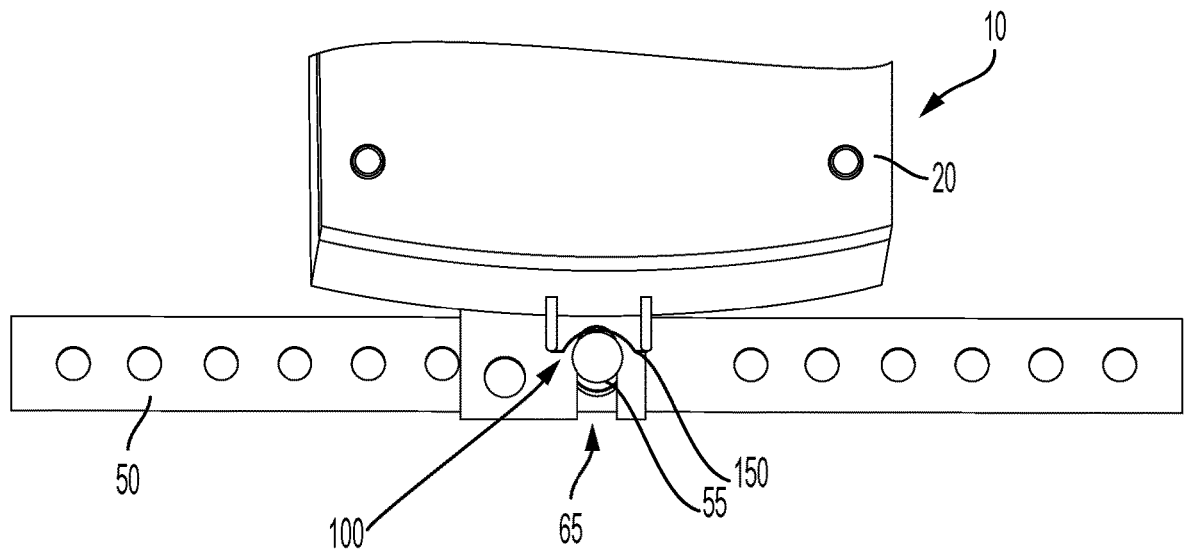
FIG. 7B is a detailed perspective view of a second configuration of the actuator and. positioning device mounted relative to the anti-rotation bracket of FIG. 7A, according to one embodiment.
Figure 8A:
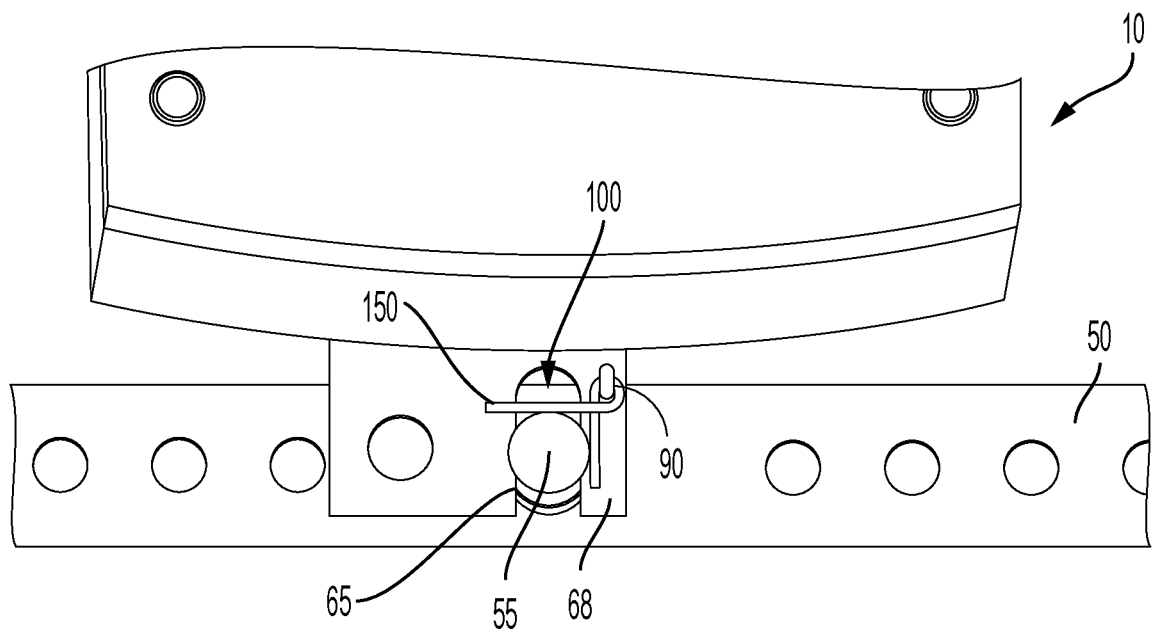
FIG. 8A is a detailed perspective view of a first configuration of an actuator including a positioning device mounted relative to an anti-rotation bracket, according to one embodiment.
Figure 8B:
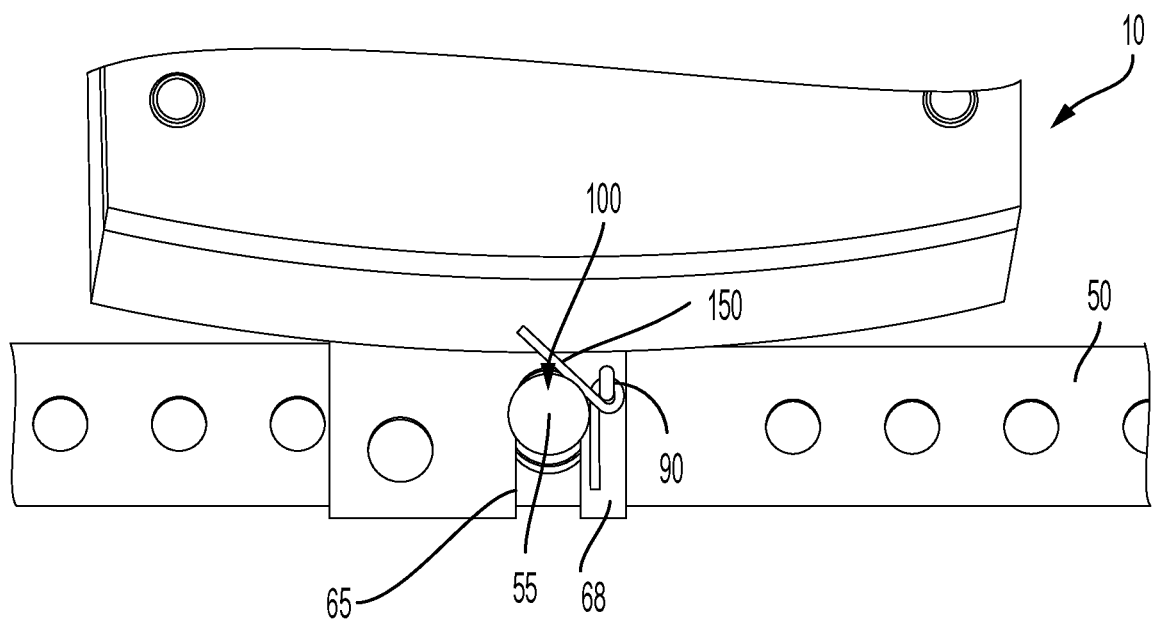
FIG. 8B is a detailed perspective view of a second configuration of the actuator and. positioning device mounted relative to the anti-rotation bracket of FIG. 8A, according to one embodiment.

As representatively illustrated by the embodiment of FIGS. 8A and 8B, the positioning device 100 may also be secured to the actuator 10 along a wall 68 defining the securement slot 65. In some such embodiments, the positioning device 100 is secured to the wall 68 via an engagement with an attachment element 90 (e.g. bracket, hook, apertured flange, etc.) formed on the wall 68. Alternatively, the positioning device 100 can he welded or adhered directly to the wall 68. Such a securement configuration of the positioning device 100 may advantageously allow existing actuators 10 to be retrofitted with a positioning device 100. As shown in FIGS. 7A and 7B, in yet other embodiments, the positioning device 100 is attached to and extends from a portion of the housing 20 (e.g. from lower surface of the housing 20).

In some embodiments, the positioning device 100 is supported by and/or incorporated into a discrete support structure 300. The support structure 300 may be welded or adhered to the actuator 10 (e.g., along wall 68, along a lower surface of the housing 20, etc.). Alternatively, as shown in FIGS. 10A-11B, the support structure 300 optionally defines a sleeve that can be slid onto the wall 68 defining the securement slot 65.

Figure 11A:
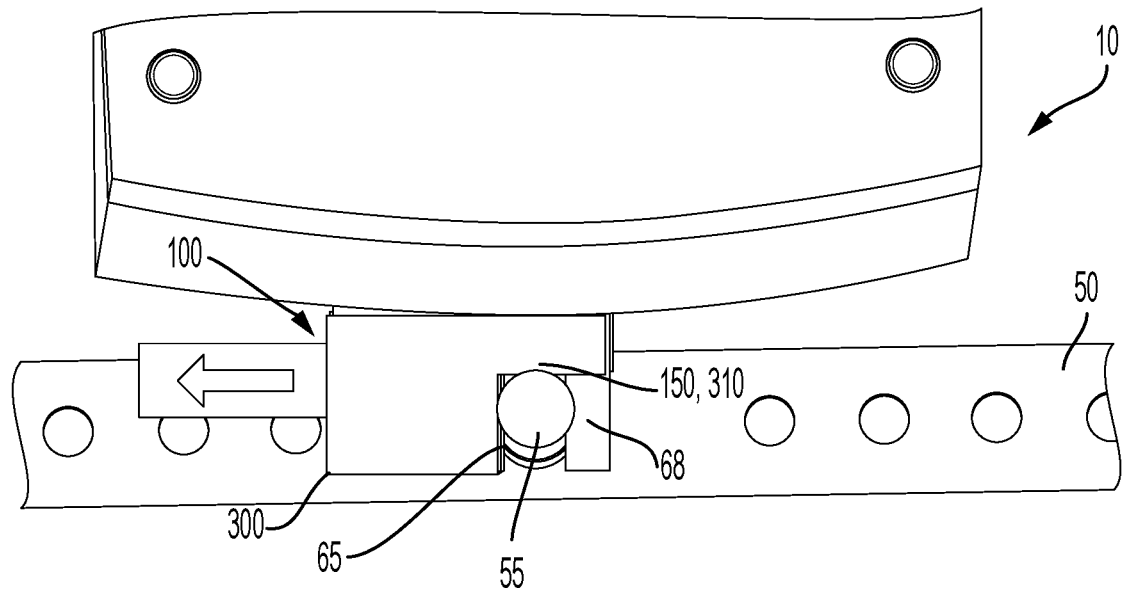
FIG. 11A is a detailed perspective view of a first configuration of an actuator including a positioning device mounted relative to an anti-rotation bracket, according to one embodiment.
Figure 11B:
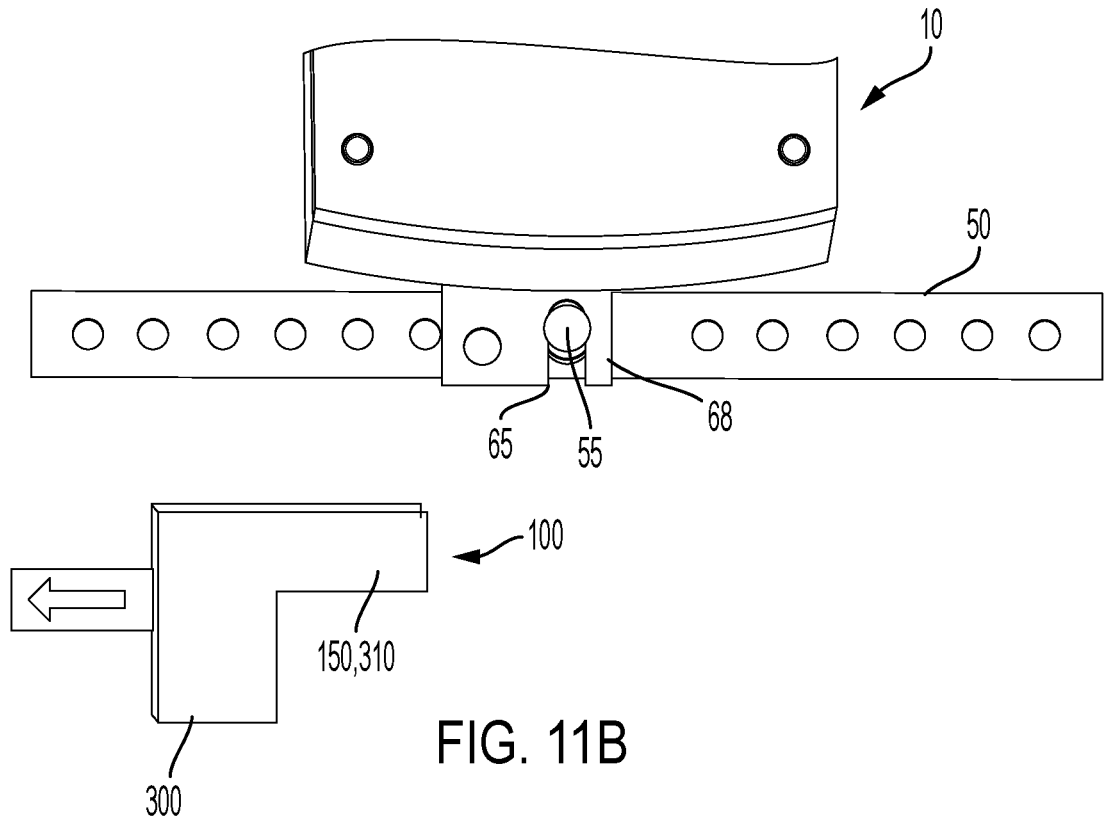
FIG. 11B is a detailed perspective view of a second configuration of the actuator and positioning device mounted relative to the anti-rotation bracket of FIG. 11A, according to one embodiment.

As illustrated by FIGS. 10A and 10B, in some embodiments, the sleeve-like support structure 300 remains attached to the actuator 10 following installation. In other embodiments, the support structure 300 defines a sleeve that is removed from the actuator 10 following installation of the actuator 10. As shown in FIGS. 11A and 11B, in some such embodiments, the positioning device 100 is defined by a blocking portion 310 of the support structure 300. As shown in FIG. 11A, the support structure 300 is positioned relative to the wall 68 defining the securement slot 65 such that a lower surface of the blocking portion 310 is positioned at a height relative to the securement slot 65 corresponding to the location of the target position 67. In such embodiments, the first configuration of the positioning device 100 is defined while the support structure 300 is supported relative to the securement slot 65. The predetermined threshold force 1corresponds to a force required to remove (e.g. slide off, peel off, or otherwise detach) the support structure 300 from the actuator 10, with the second configuration of the positioning device 100 accordingly being defined upon removal of the support structure 300 from the actuator 10.

Referring to FIGS. 9A and 9B, according to yet other embodiments, the positioning device 100 is not secured to the actuator 10, but rather is secured to the anti-rotation bracket 50 (e.g. along an upper surface of the securement element 55).

As representatively illustrated by FIG. 4, in some embodiments in which the actuator 10 may be mounted along either a rearward-facing surface or a forward-facing surface depending on a desired direction of rotation, a positioning device 100 may be secured relative to a first securement slot 65 used for mounting the actuator 10 along the rearward-facing exterior surface, as well relative to a second securement slot 65 used for mounting the actuator 10 along the forward-facing surface.

In some embodiments, reference made herein to movement of the securement element 55 relative to the securement slot 65 may be defined by any of: movement of the securement slot 65 while the securement element 55 remains stationary; movement of the securement element 55 while the securement slot 65 remains stationary; and/or movement of each of the securement slot 65 and securement element 55.

As will be appreciated, a positioning device 100 according to any of the embodiments described herein may be used with an actuator defined by a variety of different structures, arrangements, and configurations in addition to an actuator 10 according to any embodiment described herein. Non-limiting examples of various embodiments of actuators with which the positioning device 100 may be used are described and illustrated in U.S. Pat. No. 7,025,328 titled "Damper Actuator System," which is incorporated herein by reference in its entirety.

The construction and arrangement of the systems and methods as shown in the various exemplary embodiments are illustrative only. Although only a few implementations of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

Numerous specific details are described to provide a thorough understanding of the disclosure. However, in certain instances, well-known or conventional details are not described in order to avoid obscuring the description. References to "some embodiments," "one embodiment," "an exemplary embodiment," and/or "various embodiments" in the present disclosure can be, but not necessarily are, references to the same embodiment and such references mean at least one of the embodiments.

Alternative language and synonyms may be used for anyone or more of the terms discussed herein. No special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The elements and assemblies may be constructed from any of a wide variety of materials that provide sufficient strength or durability, in any of a wide variety of colors, textures, and combinations. Further, elements shown as integrally formed may be constructed of multiple parts or elements.

As used herein, the word "exemplary" is used to mean serving as an example, instance or illustration. Any implementation or design described herein as "exemplary" is not necessarily to be construed as preferred or advantageous over other implementations or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary implementations without departing from the scope of the appended claims.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As used herein, the term "coupled" means the joining of two members directly or indirectly to one another. Such joining may be stationary in nature or moveable in nature and/or such joining may allow for the glow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An actuator assembly, the actuator assembly comprising:
    a wall defining a slot that extends between an open-end formed along an edge of the wall and a second end, wherein a width of the slot as defined by the wall is substantially uniform between the open-end and the second end; and
    a positioning device comprising a pair of moveable legs that define:
        an upper section; and
        a lower section;
        wherein a first leg of the pair of legs is separated from a second leg of the pair of legs by a first distance in the upper section, and is separated from the second leg by a second distance in the lower section, the second distance being greater than the first distance; and
    an anti-rotation bracket including a securement element;
    wherein the positioning device is supported along a surface of the wall such that the positioning device extends along a length of the slot;
    wherein the lower section of the positioning device includes a constricted portion located between a first end and a second end of the lower section, a width of the lower section being defined by a third distance that is greater than the first distance and less than the second distance;
    wherein the securement element is configured to be received within the slot, and a width of the securement element is greater than each of the first distance and the third distance, and substantially the same as the second distance.

2. The actuator assembly of claim 1, wherein the constricted portion of the lower section is defined by a portion of each of the first leg and the second leg.

3. The actuator assembly of claim 1, wherein the positioning device comprising a spring clip.

4. The actuator assembly of claim 3, wherein the spring clip is secured between an exterior surface of the housing and a cover plate attached to and extending along the exterior surface of the housing.

5. The actuator assembly of claim 4, wherein the spring clip is received within a groove formed in one of the cover plate and the exterior surface of the housing.

6. The actuator assembly of claim 4, wherein the wall is defined by the cover plate.

7. A method comprising:
    securing an actuator to a rotatable shaft of an actuatable device, the actuator comprising:
        a drive member operably connected to a drive mechanism;
        a shaft adapter that secures the actuator to the shaft;
        a wall defining a slot; and
        a positioning device including an engagement structure that extends across a width of the slot at a first location along a length of the slot when the positioning device is in a first configuration;
    positioning a securement element of an anti-rotation bracket within the slot during installation of the actuator and while the positioning device is in the first configuration;
    moving the securement element relative to the slot in a first direction until the securement element engages the engagement structure, engagement between the securement element and engagement structure restricting movement of the securement element in the first direction past a portion of the slot defining a first position; and
    mounting the anti-rotation bracket to a mounting structure while the securement element is located within the slot at the first location.

8. The method of claim 7, further comprising operating the actuator to rotate the shaft;
    wherein the positioning device transitions from the first configuration to a second configuration during operation of the actuator to rotate the shaft and in response to the engagement structure being subject to a force greater than a predetermined force, the securement element being moveable in the first direction, from the first position to a position located at a length along the slot that is between the first position and a closed end of the slot, in response to the force.

9. The method of claim 8, the positioning device further including a constricting structure, the constricting structure extending across the width of the slot at a second position along the length of the slot, located between an open, first-end of the slot and the first position, while the positioning device is in the first configuration;
    wherein a width of a travel path defined by the slot is wider at the first position than a width of the travel path at the second position.

10. The method of claim 9, wherein an engagement of the securement element and the constricting structure occurring as the securement element is moved relative to the slot in the first direction during installation of the actuator causes the constricting structure to be deflected outwards.

11. The method of claim 7, wherein the positioning device comprises a pair of moveable legs that define an upper section and a lower section;

wherein a first leg of the pair of legs is separated from a second leg of the pair of legs by a first distance in the upper section, and is separated from the second leg by a second distance in the lower section, the second distance being greater than the first distance;

wherein the lower section of the positioning device includes a constricted portion located between a first end and a second end of the lower section, a width of the lower section being defined by a third distance that is greater than the first distance and less than the second distance;

wherein the securement element is configured to be received within the slot, and a width of the securement element is greater than each of the first distance and the third distance, and substantially the same as the second distance.

* * * * *